United States Patent
Bostick et al.

(10) Patent No.: US 10,593,118 B2
(45) Date of Patent: Mar. 17, 2020

(54) LEARNING OPPORTUNITY BASED DISPLAY GENERATION AND PRESENTATION

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 15/971,358

(22) Filed: May 4, 2018

(65) Prior Publication Data
US 2019/0340817 A1 Nov. 7, 2019

(51) Int. Cl.
| | |
|---|---|
| *G06T 19/00* | (2011.01) |
| *G06F 3/01* | (2006.01) |
| *G06F 3/0484* | (2013.01) |
| *G06K 9/00* | (2006.01) |
| *G02B 27/01* | (2006.01) |
| *G06F 8/30* | (2018.01) |

(52) U.S. Cl.
CPC ........ *G06T 19/006* (2013.01); *G02B 27/0172* (2013.01); *G06F 8/30* (2013.01); *G06K 9/00335* (2013.01); *G02B 2027/0138* (2013.01); *G02B 2027/0178* (2013.01)

(58) Field of Classification Search
CPC .................................................. G06T 19/006
USPC ......................................................... 345/633
See application file for complete search history.

(56) References Cited

U.S. PATENT DOCUMENTS

| | | | |
|---|---|---|---|
| 7,562,056 B2 | 7/2009 | Ma et al. | |
| 9,116,979 B2 | 8/2015 | Lee et al. | |
| 9,740,949 B1 | 8/2017 | Khosla et al. | |
| (Continued) | | | |

FOREIGN PATENT DOCUMENTS

WO          2015053891          4/2015

OTHER PUBLICATIONS

An augmented reality interface to contextual information, Antti Ajanki et al., Virtual Reality (2011) 15:161-173.*

(Continued)

*Primary Examiner* — Javid A Amini
(74) *Attorney, Agent, or Firm* — Schmeiser, Olsen & Watts; Mark C. Vallone

(57) ABSTRACT

A method and system for improving display generation and presentation is provided. The method includes generating code associated with determining and presenting contextual information via an augmented reality wearable device. Image data of a user is retrieved and current activities and associated behaviors of the user are determined. An attention level of the user with respect to an environment surrounding the user is determined and associated images are retrieved. Objects within the environment are identified and analyzed and associated learning opportunity based information is retrieved and presented to the user. Feedback data associated with the presented learning opportunity based information is retrieved and self-learning software code for executing future user information presentation processes is generated.

16 Claims, 6 Drawing Sheets

(56) References Cited

U.S. PATENT DOCUMENTS

| | | | |
|---|---|---|---|
| 2005/0047647 A1 | 3/2005 | Rutishauser et al. | |
| 2010/0045783 A1 | 2/2010 | State et al. | |
| 2012/0019557 A1 | 1/2012 | Aronsson et al. | |
| 2013/0137076 A1 | 5/2013 | Perez et al. | |
| 2014/0344012 A1 | 11/2014 | Kamhi et al. | |
| 2015/0302650 A1* | 10/2015 | Abdelmoati | G06F 3/041 345/633 |
| 2016/0004298 A1* | 1/2016 | Mazed | G06F 3/011 345/633 |
| 2016/0054797 A1* | 2/2016 | Tokubo | G06F 3/012 345/633 |
| 2016/0093105 A1* | 3/2016 | Rimon | G06T 19/006 345/633 |
| 2016/0196693 A1* | 7/2016 | Kobayashi | G06T 19/006 345/633 |
| 2017/0236332 A1* | 8/2017 | Kipman | G02B 27/0172 345/633 |
| 2017/0323158 A1 | 11/2017 | Gordon | |

OTHER PUBLICATIONS

Bobeshko, Anastasiia; Object Recognition in Augmented Reality: Choosing the Right Tool; http://geekswithblogs.net/ProgramAce/archive/2017/01/12/229275.aspx; Jan. 12, 2017; 8 pages.

Fitzgerald, Elizabeth et al.; Augmented Reality and Mobile Learning: The State of the Art; International Journal of Mobile and Blended Learning; Oct.-Dec. 2013, vol. 5, No. 4; pp. 43-58.

Kaiser, Ed et al.; Mutual Disambiguation of 3D Multimodal Interaction in Augmented and Virtual Reality; Proceedings of the 5th International Conference on Multimodal Interfaces; Nov. 5-7, 2003; pp. 12-19.

McNamara, Ann et al.; Mobile Augmented Reality: Placing Labels based on Gaze Position; 2016 IEEE International Symposium on Mixed and Augmented Reality Adjunct Proceedings; Sep. 19-23, 2016; pp. 36-37.

Mitra, Ambarish; Augmented Reality's Next Frontier Is Real-World Search; https://www.wired.com/2014/06/well-soon-be-researching-3-d-objects-just-by-looking-at-them/; Jun. 17, 2014; 2 pages.

Pfeifer, Thies; Measuring and Visualizing Attention in space with 3D Attention Volumes; Proceedings of the Symposium on Eye Tracking Research and Applications; Mar. 28-30, 2012; pp. 29-36.

Toyama, Takumi et al.; Attention Engagement and Cognitive State Analysis for Augmented Reality Text Display Functions; Proceeding of the 20th International Conference on Intelligent User Interfaces; Mar. 29-Apr. 1, 2015; pp. 322-332.

Toyama, Takumi; User Attention Oriented Augmented Reality on Documents with Document Dependent Dynamic Overlay; IEE International Symposium on Mixed and Augmented Reality; Oct. 1-4, 2013; pp. 299-300.

* cited by examiner

LEARNING OPPORTUNITY BASED DISPLAY GENERATION AND PRESENTATION

FIELD

The present invention relates generally to a method for generating a display and in particular to a method and associated system for improving display technology associated with an augmented reality wearable device generating and image information and generating self-learning software code for executing future user information presentation processes.

BACKGROUND

Accurately presenting visual data typically includes an inaccurate process with little flexibility. Controlling and modifying virtual data associated with surrounding environmental data may include a complicated process that may be time consuming and require a large amount of resources. Accordingly, there exists a need in the art to overcome at least some of the deficiencies and limitations described herein above.

SUMMARY

A first aspect of the invention provides a display generation and presentation improvement method comprising: generating, by a processor of an augmented reality wearable device, configuration code associated with determining and presenting contextual information via the augmented reality wearable device; retrieving, by the processor via a video retrieval device of the augmented reality wearable device, image data of a user; determining, by the processor executing the configuration code with respect to the image data, current activities and associated behaviors associated with the user; determining, by the processor executing the configuration code with respect to the current activities and associated behaviors and tracking data retrieved from a gaze point tracking device of the augmented reality wearable device, an attention level of the user with respect to an environment surrounding the user; retrieving, by the processor via the video retrieval device of the augmented reality wearable device, images of the environment surrounding the user; analyzing, by the processor executing the configuration code with respect to the images, objects within the environment surrounding the user; identifying, by the processor executing the configuration code with respect to the attention level of the user and results of the analyzing, specified objects of the objects; retrieving, by the processor from a plurality of remote hardware sources, information associated with the specified objects; presenting, by the processor to the user, the information via a display device of the augmented reality wearable device; retrieving, by the processor from the user via the augmented reality wearable device, feedback data associated with the information presented to the user via a display device of the augmented reality wearable device; and generating, by the processor based on the feedback data, self-learning software code for executing future user information presentation processes.

A second aspect of the invention provides a computer program product, comprising a computer readable hardware storage device storing a computer readable program code, the computer readable program code comprising an algorithm that when executed by a processor of an augmented reality wearable device implements a display generation and presentation improvement method, the method comprising: generating, by the processor, configuration code associated with determining and presenting contextual information via the augmented reality wearable device; retrieving, by the processor via a video retrieval device of the augmented reality wearable device, image data of a user; determining, by the processor executing the configuration code with respect to the image data, current activities and associated behaviors associated with the user; determining, by the processor executing the configuration code with respect to the current activities and associated behaviors and tracking data retrieved from a gaze point tracking device of the augmented reality wearable device, an attention level of the user with respect to an environment surrounding the user; retrieving, by the processor via the video retrieval device of the augmented reality wearable device, images of the environment surrounding the user; analyzing, by the processor executing the configuration code with respect to the images, objects within the environment surrounding the user; identifying, by the processor executing the configuration code with respect to the attention level of the user and results of the analyzing, specified objects of the objects; retrieving, by the processor from a plurality of remote hardware sources, information associated with the specified objects; presenting, by the processor to the user, the information via a display device of the augmented reality wearable device; retrieving, by the processor from the user via the augmented reality wearable device, feedback data associated with the information presented to the user via a display device of the augmented reality wearable device; and generating, by the processor based on the feedback data, self-learning software code for executing future user information presentation processes.

A third aspect of the invention provides a An augmented reality wearable device comprising a processor coupled to a computer-readable memory unit, the memory unit comprising instructions that when executed by the processor implements a display generation and presentation improvement method comprising: generating, by the processor, configuration code associated with determining and presenting contextual information via the augmented reality wearable device; retrieving, by the processor via a video retrieval device of the augmented reality wearable device, image data of a user; determining, by the processor executing the configuration code with respect to the image data, current activities and associated behaviors associated with the user; determining, by the processor executing the configuration code with respect to the current activities and associated behaviors and tracking data retrieved from a gaze point tracking device of the augmented reality wearable device, an attention level of the user with respect to an environment surrounding the user; retrieving, by the processor via the video retrieval device of the augmented reality wearable device, images of the environment surrounding the user; analyzing, by the processor executing the configuration code with respect to the images, objects within the environment surrounding the user; identifying, by the processor executing the configuration code with respect to the attention level of the user and results of the analyzing, specified objects of the objects; retrieving, by the processor from a plurality of remote hardware sources, information associated with the specified objects; presenting, by the processor to the user, the information via a display device of the augmented reality wearable device; retrieving, by the processor from the user via the augmented reality wearable device, feedback data associated with the information presented to the user via a display device of the augmented reality wearable device; and generating, by the processor based on the feedback data, self-learning software code for executing future user information presentation processes.

The present invention advantageously provides a simple method and associated system capable of accurately presenting visual data.

DETAILED DESCRIPTION

Figure 1:
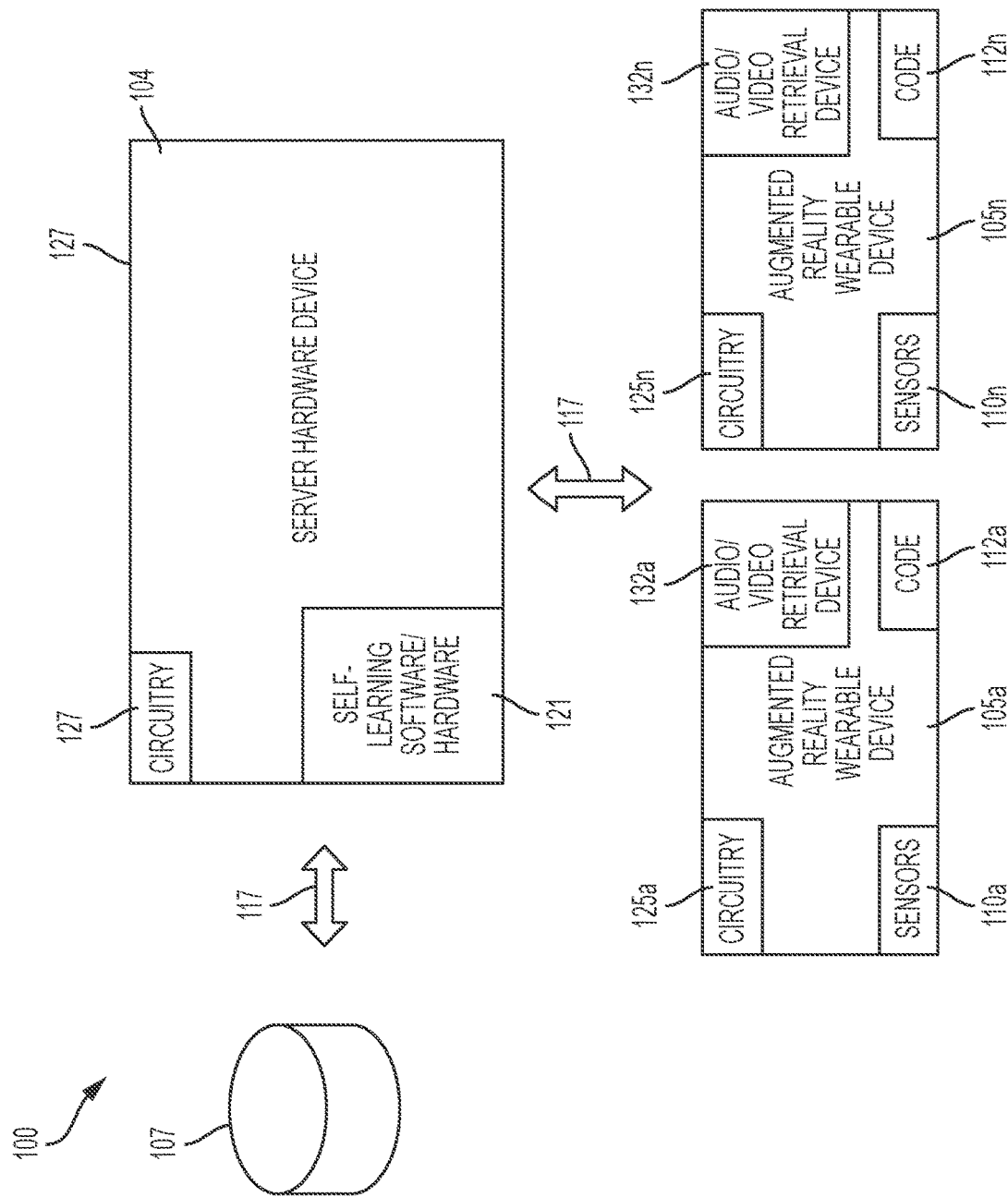
FIG. 1 illustrates a system for improving display generation and presentation technology associated with analyzing multiple video streams for presenting specified viewable data, retrieving associated feedback, and generating resulting self-learning software code for executing future user information presentation processes, in accordance with embodiments of the present invention.

FIG. 1 illustrates a system 100 for improving display generation and presentation technology associated with analyzing multiple video streams for presenting specified viewable data, retrieving associated feedback, and generating resulting self-learning software code for executing future user information presentation processes, in accordance with embodiments of the present invention. System 100 enables a server hardware device 104 in combination with augmented reality wearable devices 105a . . . 105n for generating contextual educational information for a user via augmented reality wearable devices 105a . . . 105n (e.g., wearable smart glasses) by:

1. Identifying a user's attention level with respect to surroundings based execution of a gaze point tracking process via usage of an audio/video retrieval device of an augmented reality wearable device.
2. Capturing images from an outward facing audio/video retrieval device of the augmented reality wearable device.
3. Comparing the user's attention level to a predetermined duration threshold and in response to the user's attention level exceeding the threshold:
   A. objects and activities in the captured images are identified.
   B. Information associated with the identified objects/ activities is retrieved (e.g., based on machine learned topics of interest of the user) and presented to the user via a display of the augmented reality wearable device.

Additionally, system 100 is enabled for measuring an attention level of a user with respect to detection of the user's eye focus with respect to activities and objects within a surrounding environment. In response, contextual analysis code is executed for determining if the activities and objects may be associated with learning opportunities of interest to the user. System 100 is further configured to search for and locate relevant contextual information associated with the learning opportunities of interest to the user. The relevant contextual information is presented to the user via a display portion of an augmented reality wearable device. Additionally, system 100 may be configured to measure an attention level of additional users by detecting associated eye focus levels of the additional users. In response, the user is directed to shift an eye (of the user) focus to an event within the environment presented via the display of the augmented reality wearable device. Additionally, system 100 enables a process for scoring the attention level of the user via eye focus and interaction processes to iteratively determine topics of continued interest to the user.

System 100 comprises hardware/software modules for providing the following functionality:

1. Defining a user attention level with respect to associated scoring and learning topics.
2. Learning user activities and behavior.
3. Observing and determining a user's attention level with respect to a surrounding environment.
4. Executing contextual analysis with respect to the surrounding environment for providing educational opportunity recommendations.
5. Generating self-learning software code for determining contextually relevant information detected from additional users within the environment and/or social media.
6. Searching for relevant information for educational notification recommendations.
7. Presenting a user with contextual educational information within a display of an augmented reality wearable device.
8. Detecting user feedback (via machine learning code based techniques) with respect to learning opportunities for predicting future topics.

System 100 of FIG. 1 includes a server hardware device 104 (i.e., specialized hardware device), augmented reality wearable devices 105a . . . 105n (i.e., specialized hardware device such as, inter alia, augmented reality glasses), and a database 107 (e.g., a cloud based system) interconnected through a network 117. Server database system 104 includes specialized circuitry 127 (that may include specialized software) and self-learning software code/hardware structure 121 (i.e., including self-learning software code). Augmented reality wearable devices 105a . . . 105n may include personal devices provided to each user. Augmented reality wearable devices 105a . . . 105n may be Bluetooth enabled to provide connectivity to any type of system. Augmented reality wearable devices 105a . . . 105n include specialized circuitry 125a . . . 125n (that may include specialized software), audio/video retrieval devices 132a . . . 132n, sensors 110a . . . 110n, and code 112a . . . 112n (including configuration code and generated self-learning software code for transfer to server hardware device 104). Sensors 110a . . . 110n may include any type of internal or external sensor (or biometric sensor) including, inter alia, a heart rate monitor, a blood pressure monitor, a temperature sensor, a pulse rate monitor, an ultrasonic sensor, an optical sensor, a video retrieval device, an audio retrieval device, humidity sensors, etc. Server hardware device 104, augmented reality wearable devices 105*a* . . . 105*n*, and database 107 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 104, augmented reality wearable devices 105 . . . 105*n*, and database 107 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-6. The specialized discrete non-generic analog, digital, and logic based circuitry may include proprietary specially designed components (e.g., a specialized integrated circuit, such as for example an Application Specific Integrated Circuit (ASIC) designed for only implementing an automated process for improving display generation and presentation technology associated with analyzing multiple video streams for presenting specified viewable data, retrieving associated feedback, and generating resulting self-learning software code for executing future user information presentation processes. Audio/video retrieval devices 132*a* . . . 132*n* may comprise any type of audio/video device including, inter alia, a camera with gaze point tracking hardware and software, a video camera, a still shot camera, etc. Gaze point tracking comprises a process for tracking motion of an eye by measuring either the point of gaze (i.e., a direction that a user is viewing). Gaze point tracking hardware comprises a device for measuring eye positions and eye movement. Network 117 may include any type of network including, inter alia, a local area network, (LAN), a wide area network (WAN), the Internet, a wireless network, etc. Alternatively, network 117 may include an application programming interface (API).

The following steps describe a process for analyzing multiple video streams for presenting specified viewable data, retrieving associated feedback, and presenting specified video information:

1. System 100 executes a pre-configuration process comprising:
   A. Generating environmental attention level scores. Each user may be associated with a differing time duration with respect to viewing objects within a specified environment of interest. The pre-configuration process enables users to define or generate system learning code with respect to the attention level scores. For example, with respect to an attention level score range of: 1-5:
   a. An attention level score of 1 may be associated with a time duration of 0-3 seconds and indicate that the user shows no or a low interest level with respect to objects being viewed.
   b. An attention level score of 2 may be associated with a time duration of 4-5 seconds.
   c. An attention level score of 3 may be associated with a time duration of 6-15 seconds.
   d. An attention level score of 4 may be associated with a time duration of 15-30 seconds.
   e. An attention level score of 5 may be associated with a time duration of at least 30 seconds thereby indicating that the user shows a very high interest level with respect to objects being viewed.
   B. Generating self-learning code for learning topics of interest with respect to user defined topics such as specific topics and preferences they of interest with respect to objects being viewed learning about from there environment. Additionally, the self-learning code may be generated based on machine learned topics such that cognitive software code identifies patterns of interest from user viewpoint focus and associated activities being performed.
   C. Generating an information attributes template such that the user may define specific attributes associated with objects or events to search and display. For example: people based attributes (e.g., names, companies, etc.), structure based attributes (e.g., a building date, a building history, etc.), event based attributes (e.g., a concert, a band name, etc.), etc.
   D. Generating code for learning displayed information attention level scoring such that an attentiveness of a user is detected and measured based on information displayed with respect to a learning event or topic such that a future determination may be enabled with respect to predicting a user topic of interest.
2. System 100 executes code for automatically learning user activities and associated behavior. For example, one or more augmented reality wearable devices (i.e., augmented reality glasses, a smartwatch, a mobile phone, etc.) of a user is enabled for tracking (e.g., via sensors and/or video cameras) user activities and determining associated user behavior. The tracked user activities are used for identifying patterns with respect to historical analysis code executed with respect to detected topics of interest (with respect to learning) of the user.
3. System 100 executes code for automatically observing and determining a user's attention level with respect to surrounding objects in an environment. For example, a user may be fitted with augmented reality glasses with an integrated outward facing camera to capture images of a surrounding environment being viewed. The augmented reality glasses include a camera comprising gaze point tracking hardware and software for measuring a user's attention level with respect to the surrounding environment. Based on the user's motion, eye movement, and eye focus, software code is enabled to calculate a level of attention with respect to surrounding objects being viewed. Additionally, the software is enabled to map the user's attention level scoring criteria and associated thresholds to determine if further processing is required.
4. System 100 executes code for automatically performing a contextual analysis of surrounding objects for providing an educational opportunity for the user. For example, a camera within a head mounted display (of the augmented reality glasses) is enabled to capture images of the surrounding environment. If it is determined that the user's eye focus exceeds a defined attention threshold, images may be processed (in real time) for contextual analysis using image analytics in combination with execution of a remote cognitive system. When objects and activities are identified from the contextual analysis, software code will evaluate if the identified topic comprises a learning topic of interest of the user (e.g., user defined, machine learned, etc.).
5. System 100 executes code for automatically executing code for determining contextually relevant information learned from additional users within the viewed environment or social media. For example, if a learning event is not located within a field of view of the user, but is currently being watched by other people within a surrounding area, the user will be notified to change an eye focus direction with respect to viewing the learning event.

If the user approves of the surrounding learning content, a social networking site may automatically share the surrounding learning content with a nearby user.
6. System 100 executes code for automatically searching for relevant information for educational opportunity notification. Likewise, topics of interest are identified with respect to an attention level threshold. A resulting template is defined such that specific items of interest are included in an educational opportunity for the user.
7. System 100 executes code for automatically presenting contextual educational information to the user via the augmented reality display. If the user indicates that the contextual educational information is acceptable, the augmented reality display enables a process for overlaying one or more photographs of the user.
8. System 100 executes code for automatically retrieving machine learned user feedback with respect to learning opportunities to predict future topics for presentation. Each time the user is presented with a learning opportunity with respect to a display of information determined to be contextually relevant to the user, software code is enabled to will measure an attentiveness of the user's eye focus (and interaction with content) with respect to the displayed information on the augmented reality display. Additionally, feedback may be measured or verified via biometric means. An attentiveness level with respect to learning topics may be scored to determine future presentation of learning opportunities.

The following implementation example describes a process depicting a user viewing an animal interacting with its offspring. In response, a head mounted display of an augmented reality display device identifies a user's attention level and based on results determined via image analysis software installed within the augmented reality display device, a contextual description of the surrounding area is identified. Subsequently, software code is executed for identifying any similarities with human behavior thereby identifying a potential learning opportunity. In response, the head mounted display automatically overlays the learning opportunity within the surrounding area. Additionally, the head mounted display determines if the learning opportunity is relevant and presents associated information, accordingly.

Figure 2:
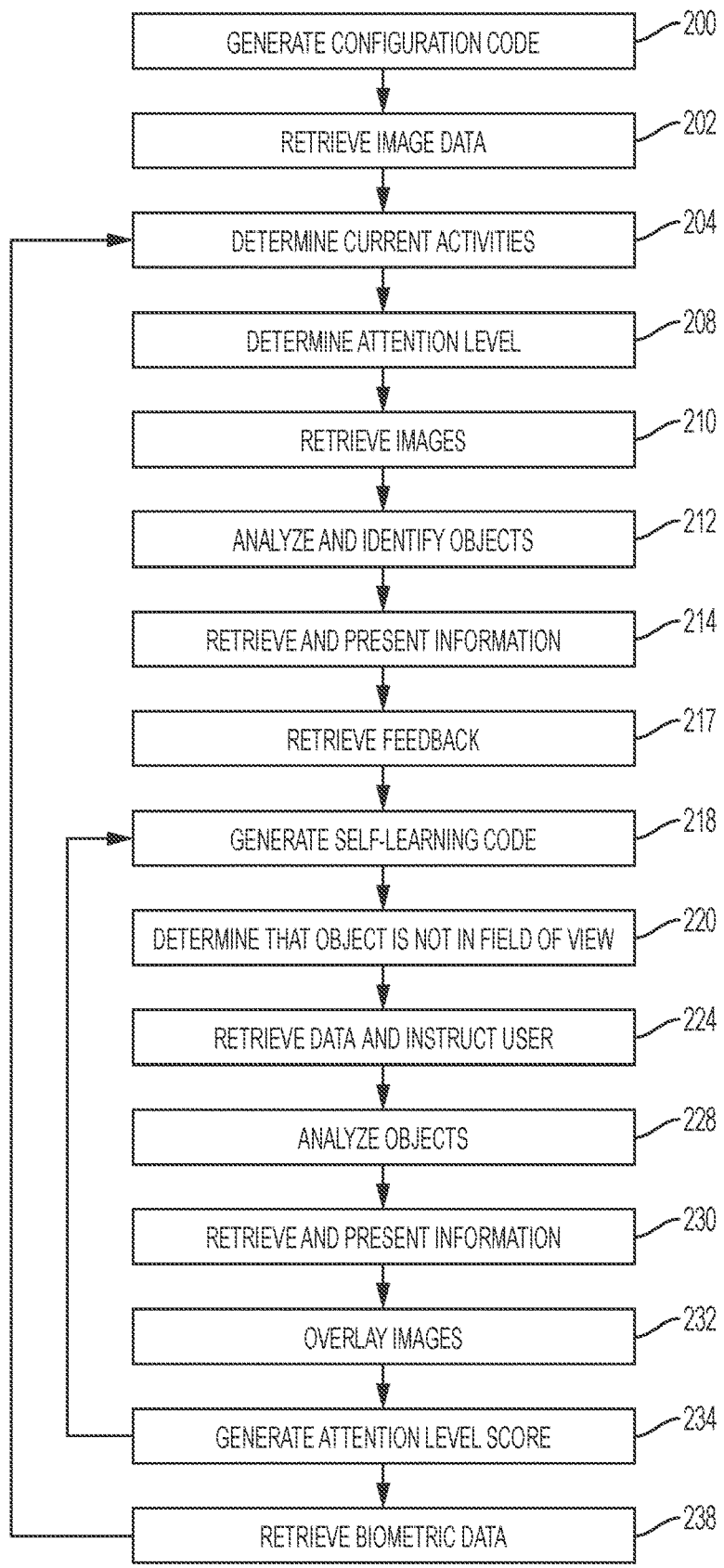
FIG. 2 illustrates an algorithm detailing a process flow enabled by the system of FIG. 1 for improving display generation and presentation technology associated with analyzing multiple video streams for presenting specified viewable data, retrieving associated feedback, and generating resulting self-learning software code for executing future user information presentation processes, in accordance with embodiments of the present invention.

FIG. 2 illustrates an algorithm detailing a process flow enabled by system 100 of FIG. 1 for improving display generation and presentation technology associated with analyzing multiple video streams for presenting specified viewable data, retrieving associated feedback, and generating resulting self-learning software code for executing future user information presentation processes, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 104 and augmented reality wearable devices 105*a* . . . 105*n*. In step 200, configuration code is generated. The configuration code is associated with determining and presenting contextual information via the augmented reality wearable device. Generating the configuration code includes defining an environmental attention level time frame threshold; defining topics of interest for multiple users; retrieving attributes associated with specified objects of interest associated with the user; retrieving attention level threshold of the user; and incorporating the environmental attention level time frame threshold, the topics of interest, the attributes, and the attention level threshold within said configuration code. In step 202, image data of a user is retrieved via a video retrieval device of an augmented reality wearable device. In step 204, current activities and associated user behaviors are determined via execution of the configuration code with respect to the image data. In step 208, an attention level of the user with respect to an environment surrounding the user is determined. The attention level is determined based on the current activities and associated behaviors and tracking data retrieved from a gaze point tracking device of the augmented reality wearable device. The attention level of the user may be further determined by: detecting (via the gaze point tracking device), motion of the user, eye movement of the user, and eye focus of the user; and comparing the motion, the eye movement, and the eye focus to a predetermined attention level threshold. Additionally, the predetermined attention level threshold may be determined based on executing the self-learning software code with respect to previously retrieved attention levels of the user.

In step 210, images of the environment surrounding the user are retrieved via the video retrieval device of the augmented reality wearable device. In step 212, objects in the images are analyzed and specified objects are identified based on the attention level of the user and results of the analysis. The specified objects may be associated with learning topics of interest for user. In step 214, information associated with the specified objects is retrieved from remote hardware sources. The information is presented (to the user) via a display device of the augmented reality wearable device. The information may include a learning opportunity for the user.

In step 217, feedback data is retrieved (from the user) via the augmented reality wearable device. The feedback data is associated with the information presented to the user via the display device of the augmented reality wearable device. The feedback data may include additional biometric data retrieved via a plurality of biometric sensors of the augmented reality wearable device. In step 218, self-learning software code for executing future user information presentation processes is generated based on the feedback data. The self-learning software code may be generated based on detected user interaction with the information being presented to the user via the display device of the augmented reality wearable device. In step 220, it is determined (based on the tracking data) that that said a group of objects is not within a field of view (via the augmented reality wearable device) of the user. In step 224, additional data (indicating that additional users are currently viewing group of objects) is retrieved from additional augmented reality wearable devices of the additional users. In response, the user is instructed to view the group of objects. In step 228, the group of objects is analyzed with respect to the images. In step 230, additional information associated with the group of objects is retrieved from remote hardware sources. The additional information is presented to the user via the display device of the augmented reality wearable device. In step 232, images of the user are overlaid with respect to the information via the display device of the augmented reality wearable device. In step 234, an attention level score for said attention level of the user is generated with respect to the information being presented to the user. Additionally, step 218 is repeated to generate the self-learning software code based on the attention level score. In step 238, biometric data of the user is retrieved via a plurality of sensors connected to the augmented reality wearable device and step 204 is repeated to determine the current activities and associated behaviors via execution of the configuration code with respect to the biometric data.

Figure 3:
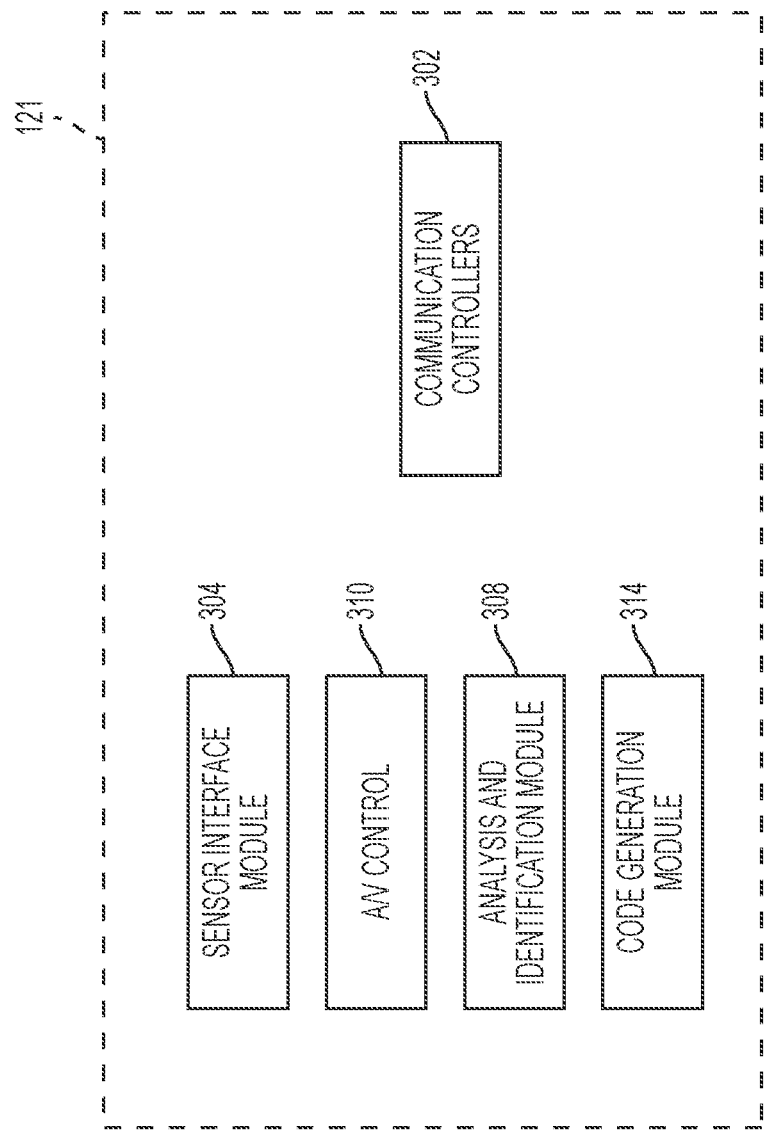
FIG. 3 illustrates an internal structural view of the self-learning software/hardware structure of FIG. 1, in accordance with embodiments of the present invention.

FIG. 3 illustrates an internal structural view of self-learning software/hardware structure 121 of FIG. 1, in accordance with embodiments of the present invention. Self-learning software/hardware structure 121 includes a sensor interface module 304, an audio video control module 310, an analysis and identification module 308, a code generation module 314, and communication controllers 302. Sensor interface module 304 comprises specialized hardware and software for controlling all functions related to sensors 110a . . . 110n of FIG. 1. Audio video control module 310b comprises specialized hardware and software for controlling all functionality related to audio video retrieval devices 132a . . . 132n for retrieving image data and implementing the process described with respect to the algorithm of FIG. 2. Analysis and identification module 308 comprises specialized hardware and software for controlling all functions related to image analysis, contextual analysis of processed images, and identification of learning opportunities associated with the user and associated preferences. Code generation module 314 comprises specialized hardware and software for controlling all functions related to generating machine learning user feedback with respect to learning opportunities in combination with scoring attention levels and generating self-learning software code for executing future user information presentation processes. Communication controllers 302 are enabled for controlling all communications between sensor interface module 304, audio video control module 310, analysis and identification module 308, and code generation module 314.

Figure 4:
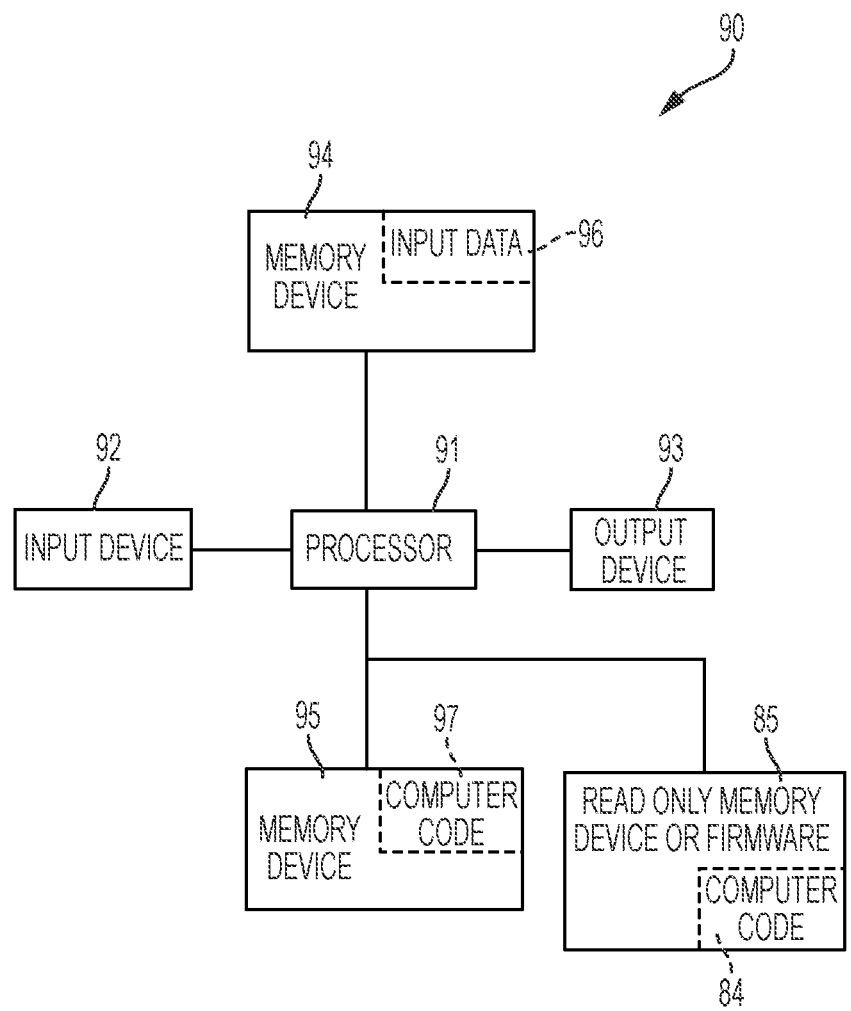
FIG. 4 illustrates a computer system used by the system of FIG. 1 for improving display generation and presentation technology associated with analyzing multiple video streams for presenting specified viewable data, retrieving associated feedback, and generating resulting self-learning software code for executing future user information presentation processes, in accordance with embodiments of the present invention.

FIG. 4 illustrates a computer system 90 (e.g., augmented reality wearable devices 105a . . . 105n and/or server hardware device 104 of FIG. 1) used by or comprised by the system of FIG. 1 for improving display generation and presentation technology associated with analyzing multiple video streams for presenting specified viewable data, retrieving associated feedback, and generating resulting self-learning software code for executing future user information presentation processes, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving display generation and presentation technology associated with analyzing multiple video streams for presenting specified viewable data, retrieving associated feedback, and generating resulting self-learning software code for executing future user information presentation processes. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve display generation and presentation technology associated with analyzing multiple video streams for presenting specified viewable data, retrieving associated feedback, and generating resulting self-learning software code for executing future user information presentation processes. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving display generation and presentation technology associated with analyzing multiple video streams for presenting specified viewable data, retrieving associated feedback, and generating resulting self-learning software code for executing future user information presentation processes. In another embodiment, the invention provides a business method that performs the process steps of the invention on a subscription, advertising, and/or fee basis. That is, a service supplier, such as a Solution Integrator, could offer to enable a process for improving display generation and presentation technology associated with analyzing multiple video streams for presenting specified viewable data, retrieving associated feedback, and generating resulting self-learning software code for executing future user information presentation processes. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a configuration of hardware and software, any configuration of hardware and software, as would be known to a person of ordinary skill in the art, may be utilized for the purposes stated supra in conjunction with the computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
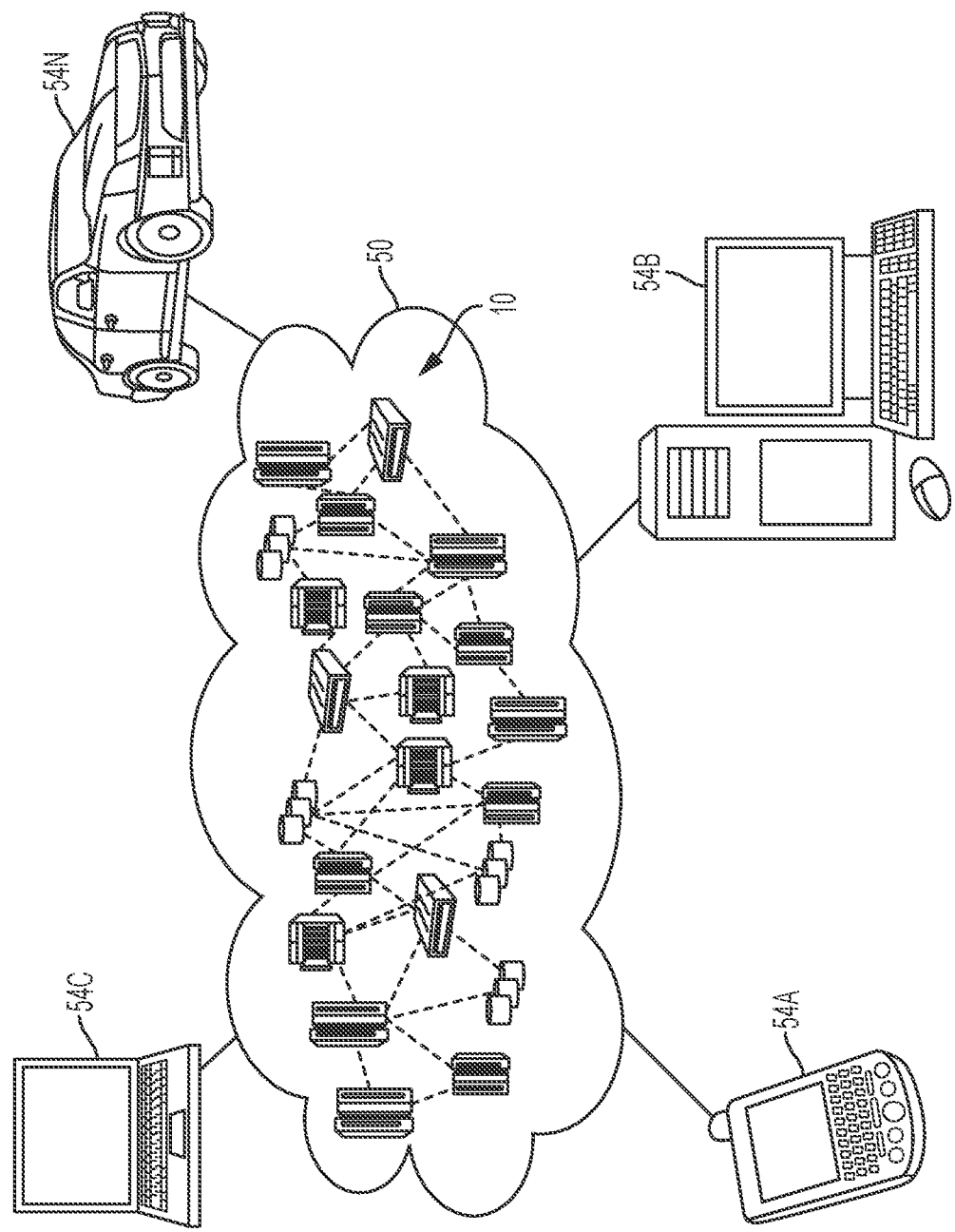
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
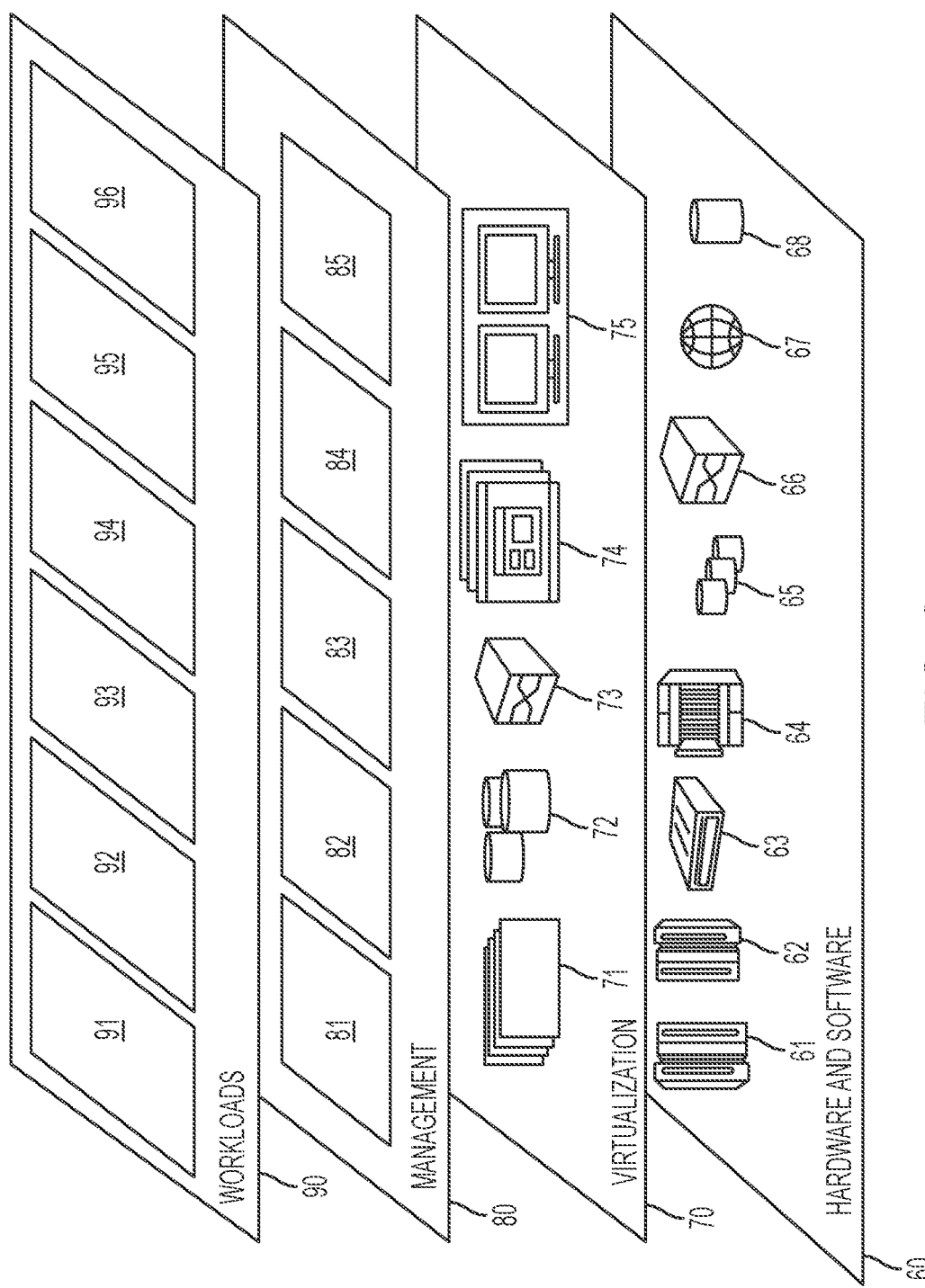
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving display generation and presentation technology associated with analyzing multiple video streams for presenting specified viewable data, retrieving associated feedback, and generating resulting self-learning software code for executing future user information presentation processes 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A display generation and presentation improvement method comprising:
   generating, by a processor of an augmented reality wearable device, configuration code associated with determining and presenting contextual information via said augmented reality wearable device;
   retrieving, by said processor via a video retrieval device of said augmented reality wearable device, image data of a user;
   retrieving, by said processor via a plurality of sensors connected to said augmented reality wearable device, biometric data of said user, wherein said biometric data comprises data retrieved from a heart rate monitor, a blood pressure monitor, a temperature sensor, a pulse rate monitor, an ultrasonic sensor, and an optical sensor;
   determining, by said processor executing said configuration code with respect to said image data and said biometric data, current activities and associated behaviors associated with said user;
   determining, by said processor executing said configuration code with respect to said current activities and associated behaviors and tracking data retrieved from a gaze point tracking device of said augmented reality wearable device, an attention level of said user with respect to an environment surrounding said user, wherein said determining said attention level of said user comprises:
     detecting, by said gaze point tracking device, motion of said user, eye movement of said user, and eye focus of said user; and
     comparing said motion, said eye movement, and said eye focus to a predetermined attention level threshold;
   retrieving, by said processor via said video retrieval device of said augmented reality wearable device, images of said environment surrounding said user;
   analyzing, by said processor executing said configuration code with respect to said images, objects and activities within said environment surrounding said user;
   identifying, by said processor executing said configuration code with respect to said attention level of said user and results of said analyzing, specified objects of said objects;
   identifying, by said processor executing said configuration code with respect to said attention level of said user and results of said analyzing, specified activities of said activities;
   retrieving, by said processor from a plurality of remote hardware sources, educational information associated with said user with respect to said specified objects and said specified activities;
   presenting, by said processor to said user, said educational information via a display device of said augmented reality wearable device;
   retrieving, by said processor from said user via said augmented reality wearable device, feedback data associated with said information presented to said user via a display device of said augmented reality wearable device;
   generating, by said processor, an attention level score for said attention level of said user with respect to said educational information being presented to said user;
   generating, by said processor based on said feedback data and said attention level score, self-learning software code for executing future user information presentation processes; and
   overlaying by said processor, images of said user with respect to said educational information via said display device of said augmented reality wearable device.

2. The method of claim 1, wherein said generating said configuration code comprises:
   defining an environmental attention level time frame threshold;
   defining topics of interest for multiple users;
   retrieving attributes associated with specified objects of interest associated with said user;
   retrieving attention level threshold of said user; and
   incorporating said environmental attention level time frame threshold, said topics of interest, said attributes, and said attention level threshold within said configuration code.

3. The method of claim 1, further comprising:
   determining, by said processor executing said configuration code with respect to said tracking data, that said a group of objects of said objects is not within a field of view, via said augmented reality wearable device, of said user;
   retrieving, by said processor from a plurality of additional augmented reality wearable devices of additional users, additional data indicating that said additional users are currently viewing said group of objects;

instructing, by said processor based on said additional data, said user to view said group of objects;
analyzing, by said processor executing said configuration code with respect to said images, said group of objects;
retrieving, by said processor from said plurality of remote hardware sources, additional information associated with said group of objects; and
presenting, by said processor to said user, said additional information via said display device of said augmented reality wearable device.

4. The method of claim 1, wherein said specified objects of said objects are associated with learning topics of interest for said user, and wherein said presenting said information comprises presenting a learning opportunity for said user.

5. The method of claim 1, wherein said video retrieval device comprises an outward facing camera of said augmented reality wearable device.

6. The method of claim 1, wherein said predetermined attention level threshold is determined based on user input.

7. The method of claim 1, wherein said predetermined attention level threshold is determined based on executing said self-learning software code with respect to previously retrieved attention levels of said user.

8. The method of claim 1, wherein said feedback data comprises additional biometric data retrieved via a plurality of biometric sensors of said augmented reality wearable device.

9. The method of claim 1, wherein said self-learning software code is generated based on detected user interaction with said information being presented to said user via said display device of said augmented reality wearable device.

10. The method of claim 1, further comprising:
providing at least one support service for at least one of creating, integrating, hosting, maintaining, and deploying computer-readable code in the control hardware, said code being executed by the computer processor to implement: said generating said configuration code, said retrieving said image data, said determining said current activities and associated behaviors, said retrieving said images, said analyzing, said identifying, said retrieving said information, said presenting, said retrieving said feedback data, and said generating said self-learning software code.

11. A computer program product, comprising a computer readable hardware storage device storing a computer readable program code, said computer readable program code comprising an algorithm that when executed by a processor of an augmented reality wearable device implements a display generation and presentation improvement method, said method comprising:
generating, by said processor, configuration code associated with determining and presenting contextual information via said augmented reality wearable device;
retrieving, by said processor via a video retrieval device of said augmented reality wearable device, image data of a user;
retrieving, by said processor via a plurality of sensors connected to said augmented reality wearable device, biometric data of said user, wherein said biometric data comprises data retrieved from a heart rate monitor, a blood pressure monitor, a temperature sensor, a pulse rate monitor, an ultrasonic sensor, and an optical sensor;
determining, by said processor executing said configuration code with respect to said image data and said biometric data, current activities and associated behaviors associated with said user;
determining, by said processor executing said configuration code with respect to said current activities and associated behaviors and tracking data retrieved from a gaze point tracking device of said augmented reality wearable device, an attention level of said user with respect to an environment surrounding said user, wherein said determining said attention level of said user comprises:
detecting, by said gaze point tracking device, motion of said user, eye movement of said user, and eye focus of said user; and
comparing said motion, said eye movement, and said eye focus to a predetermined attention level threshold;
retrieving, by said processor via said video retrieval device of said augmented reality wearable device, images of said environment surrounding said user;
analyzing, by said processor executing said configuration code with respect to said images, objects and activities within said environment surrounding said user;
identifying, by said processor executing said configuration code with respect to said attention level of said user and results of said analyzing, specified objects of said objects;
identifying, by said processor executing said configuration code with respect to said attention level of said user and results of said analyzing, specified activities of said activities;
retrieving, by said processor from a plurality of remote hardware sources, educational information associated with said user with respect to said specified objects and said specified activities;
presenting, by said processor to said user, said educational information via a display device of said augmented reality wearable device;
retrieving, by said processor from said user via said augmented reality wearable device, feedback data associated with said information presented to said user via a display device of said augmented reality wearable device;
generating, by said processor, an attention level score for said attention level of said user with respect to said educational information being presented to said user;
generating, by said processor based on said feedback data and said attention level score, self-learning software code for executing future user information presentation processes; and
overlaying by said processor, images of said user with respect to said educational information via said display device of said augmented reality wearable device.

12. The computer program product of claim 11, wherein said generating said configuration code comprises:
defining an environmental attention level time frame threshold;
defining topics of interest for multiple users;
retrieving attributes associated with specified objects of interest associated with said user;
retrieving attention level threshold of said user; and
incorporating said environmental attention level time frame threshold, said topics of interest, said attributes, and said attention level threshold within said configuration code.

13. The computer program product of claim 11, wherein said method further comprises:

determining, by said processor executing said configuration code with respect to said tracking data, that said a group of objects of said objects is not within a field of view, via said augmented reality wearable device, of said user;

retrieving, by said processor from a plurality of additional augmented reality wearable devices of additional users, additional data indicating that said additional users are currently viewing said group of objects;

instructing, by said processor based on said additional data, said user to view said group of objects;

analyzing, by said processor executing said configuration code with respect to said images, said group of objects;

retrieving, by said processor from said plurality of remote hardware sources, additional information associated with said group of objects; and presenting, by said processor to said user, said additional information via said display device of said augmented reality wearable device.

14. The computer program product of claim 11, wherein said specified objects of said objects are associated with learning topics of interest for said user, and wherein said presenting said information comprises presenting a learning opportunity for said user.

15. The computer program product of claim 11, wherein said video retrieval device comprises an outward facing camera of said augmented reality wearable device.

16. An augmented reality wearable device comprising a processor coupled to a computer-readable memory unit, said memory unit comprising instructions that when executed by the processor implements a display generation and presentation improvement method comprising:

generating, by said processor, configuration code associated with determining and presenting contextual information via said augmented reality wearable device;

retrieving, by said processor via a video retrieval device of said augmented reality wearable device, image data of a user;

retrieving, by said processor via a plurality of sensors connected to said augmented reality wearable device, biometric data of said user, wherein said biometric data comprises data retrieved from a heart rate monitor, a blood pressure monitor, a temperature sensor, a pulse rate monitor, an ultrasonic sensor, and an optical sensor;

determining, by said processor executing said configuration code with respect to said image data and said biometric data, current activities and associated behaviors associated with said user;

determining, by said processor executing said configuration code with respect to said current activities and associated behaviors and tracking data retrieved from a gaze point tracking device of said augmented reality wearable device, an attention level of said user with respect to an environment surrounding said user, wherein said determining said attention level of said user comprises:

detecting, by said gaze point tracking device, motion of said user, eye movement of said user, and eye focus of said user; and comparing said motion, said eye movement, and said eye focus to a predetermined attention level threshold;

retrieving, by said processor via said video retrieval device of said augmented reality wearable device, images of said environment surrounding said user;

analyzing, by said processor executing said configuration code with respect to said images, objects and activities within said environment surrounding said user;

identifying, by said processor executing said configuration code with respect to said attention level of said user and results of said analyzing, specified objects of said objects;

identifying, by said processor executing said configuration code with respect to said attention level of said user and results of said analyzing, specified activities of said activities;

retrieving, by said processor from a plurality of remote hardware sources, educational information associated with said user with respect to said specified objects and said specified activities;

presenting, by said processor to said user, said educational information via a display device of said augmented reality wearable device;

retrieving, by said processor from said user via said augmented reality wearable device, feedback data associated with said information presented to said user via a display device of said augmented reality wearable device;

generating, by said processor, an attention level score for said attention level of said user with respect to said educational information being presented to said user;

generating, by said processor based on said feedback data and said attention level score, self-learning software code for executing future user information presentation processes; and overlaying by said processor, images of said user with respect to said educational information via said display device of said augmented reality wearable device.

* * * * *